Jan. 11, 1927.

B. C. VON PLATEN ET AL 1,613,629

REFRIGERATION

Original Filed Nov. 21, 1925

Patented Jan. 11, 1927.

1,613,629

UNITED STATES PATENT OFFICE.

BALTZAR CARL von PLATEN AND CARL GEORG MUNTERS, OF STOCKHOLM, SWEDEN, ASSIGNORS, BY MESNE ASSIGNMENTS, TO ELECTROLUX SERVEL CORPORATION, A CORPORATION OF DELAWARE.

REFRIGERATION.

Original application filed November 21, 1925, Serial No. 70,648, and in Sweden May 3, 1924. Divided and this application filed August 11, 1926. Serial No. 128,552.

This application is a division of our copending application Serial No. 70,648, filed November 21, 1925.

The present invention relates to refrigerating apparatus of the absorption type and more particularly to such apparatus wherein there is a constant total or gage pressure throughout and in which refrigeration is obtained by evaporation due to diffusion of a cooling agent into another substance.

The invention has for its object to provide an improved circulation between the absorber and the generator in refrigerators of the type above referred to and consists in arranging a series of members to form pockets in a conduit connecting the absorber with the generator to which heat is applied, the arrangement being of such nature that vaporization in the pockets causes flow of liquid.

Figure 1:
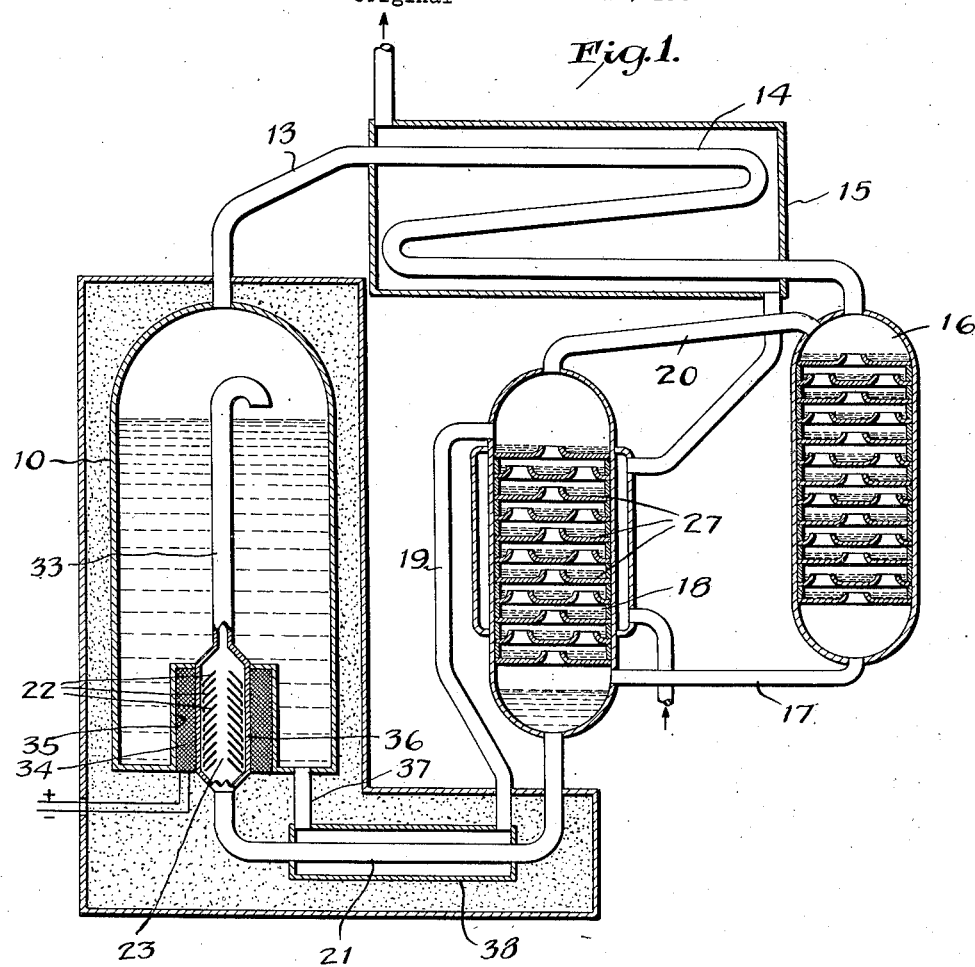
Figure 2:
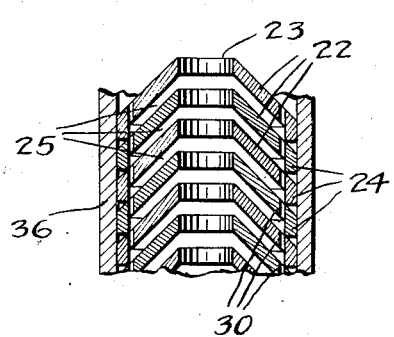

The invention will be more readily understood by reference to the accompanying drawing in which:

Fig. 1 shows one embodiment of the invention in which a series of cone-shaped members are placed in a hollow member forming a part of a conduit connecting the absorber with the vapor space of the generator; and Fig. 2 shows the cone-shaped members of Fig. 1 on an enlarged scale.

Referring more particularly to Fig. 1, reference character 10 designates the generator which contains absorption liquid and in which a cooling agent is expelled from solution by heat, this being effected in the embodiment shown by means of an electric heating element 34 which is situated within a heating chamber 35 of cylindrical formation which is formed within the generator 10 and extends upwardly from the bottom thereof. Vapor generated in generator 10 passes through conduit 13 into condenser 14 which comprises a conduit in which the vapor is condensed by means of a cooling fluid circulating through cooling jacket 15 surrounding the conduit. From the condenser 14 the cooling agent in the form of liquid passes into the evaporator 16 where it mixes with an auxiliary agent into which it diffuses and evaporates, thus producing refrigeration. For the sake of illustration, assume that the cooling agent is ammonia and the auxiliary agent is hydrogen. Ammonia gas and hydrogen then pass downwardly through the evaporator as a mixture and through conduit 17 into the lower part of absorber 18. In the absorber the ammonia gas is separated from the hydrogen and passes into solution in absorption liquid supplied to the absorber by way of conduit 19. The hydrogen thus freed passes upwardly in the absorber and through conduit 20 back into the evaporator to again mix with ammonia coming from the condenser. The present invention is not specifically directed to the general arrangement thus far described, and this arrangement is herein set out for the purpose of illustration. For a further and more detailed description of the operation of the parts hereinbefore described, reference may be had to Patent No. 1,609,334 of December 7, 1926. The arrangement thus far described and as set out in that patent is not the only arrangement applicable to use with the present invention as will be understood upon further description.

Rich absorption liquid passes through conduit 21 and enters a hollow member 36 which is of cylindrical formation and of greater diameter than conduit 21 and situated within heating chamber 35 but spaced from the wall thereof to give room for the heating element 34 which occupies what might be termed a heating space formed between hollow member 36 and the wall of heating chamber 35. A conduit 33 connects the upper part of hollow member 36 with the vapor space of generator 10. Within hollow member 36 is situated a series of cones 22, preferably of thin compressed steel. The cones have openings at their apices forming a central passageway 23 for flow of absorption liquid. The cones are made and arranged so as to leave a pocket 25 between any of two adjacent cones, this being accomplished in the embodiment illustrated by means of flanges 24, more clearly shown in Fig. 2. Pockets 25 extend obliquely upwardly and form paths for vapor produced therein which vapor being injected into the central passageway 23 acts in the manner of an injector to give an upward movement to the liquid in the central passage-way. The formation of vapor in pockets 25 is effected by having heating element 34 surrounding hollow member 36 at the portions of the hollow member where passage-ways 25 are adjacent the shell of the same. Not only is there a great transfer of heat through the shell, but the cones also act as heat transmitting members and conduct heat through their oblique length to the fluid within pockets 25. In order that the heat transmission shall be as effective as possible, the cones are so made and inserted into the generator that the flanges 24 have a tight fit with the shell of the hollow member.

Weak absorption liquid passes from the lower part of the generator through conduit 37 and into chamber 38 which is in heat exchange relation with a portion of conduit 21 for conservation of heat and thence passes through conduit 19 into the absorber to absorb the cooling medium.

In operation vapor bubbles are formed in the lower part of each of the pockets 25, the first formation of vapor occurring directly adjacent the shell of hollow member 36 due to the greater rate of heat conductivity to these places and thus there is formed in each pocket a body of obliquely extending liquid with one or more bubbles of vapor formed behind the body and expanding against the body due to evaporation. Thus there is a multitude of upwardly directed forces having a common effect of forcing liquid upwardly within hollow member 36 and upwardly within conduit 33 into the vapor space of the generator to mingle with the main body of solution therein. This action is caused by the intermittent flow of liquid into pockets 25, formation of vapor therein and the expulsion of liquid therefrom.

What we claim is:—

1. Refrigerating apparatus comprising a generator, an evaporator, an absorber, a conduit extending between said absorber and said generator, an enlarged portion in said conduit, a series of pockets in said enlarged portion, an electric heating element surrounding said portion and means to conduct liquid from the generator to the absorber.

2. Refrigerating apparatus comprising a generator, an evaporator, an absorber, a heating chamber within said generator, a hollow member within said heating chamber spaced from the wall of the heating chamber to form a heating space, a conduit connecting said absorber with said hollow member, a conduit connecting said hollow member with said generator, a series of pockets within said hollow member extending obliquely to the general line of flow therethrough and opening in direction toward the generator and a conduit for conducting fluid from said generator to said absorber.

3. Refrigerating apparatus comprising a generator, an evaporator, an absorber, a heating chamber within said generator, a hollow element within said heating chamber spaced from the wall of the heating chamber to form a heating space, an electric heating element in said heating space, a conduit connecting said absorber with said hollow member, a conduit connecting said hollow member with said generator, a series of pockets within said hollow member extending obliquely to the general line of flow therethrough and opening in direction toward the generator and a conduit for conducting fluid from said generator to said absorber.

4. Refrigerating apparatus comprising a generator, an evaporator, an absorber, a heating chamber within said generator, a hollow element within said heating chamber spaced from the wall of the heating chamber to form a heating space, a conduit connecting said absorber with said hollow member, a conduit connecting said hollow member with said generator and opening into the vapor space thereof, a series of pockets within said hollow member extending obliquely to the general line of flow therethrough and opening in direction toward the generator and having their closed ends in proximity to said heating space and a conduit for conducting fluid from said generator to said absorber.

5. Refrigerating apparatus comprising a generator, an evaporator, an absorber, a heating chamber within said generator, a hollow element within said heating chamber spaced from the wall of the heating chamber to form a heating space, an electric heating element in said heating space, a conduit connecting said absorber with said hollow member, a conduit connecting said hollow member with said generator, a series of elements in said hollow member forming a central passageway and a series of pockets surrounding said passageway and extending upwardly and obliquely with respect to and opening into said central passageway and having their lower ends in proximity to said heating space and a conduit for conducting fluid from said generator to said absorber.

6. Refrigerating apparatus comprising a generator, an evaporator, an absorber, a hollow member, an electric heating element surrounding said hollow member, a conduit connecting said absorber with said hollow member, a conduit connecting said hollow member with the vapor space of said generator, a series of pockets within said hollow member extending obliquely to the general line of flow therethrough and opening in direction toward the generator and a conduit for conducting fluid from said generator to said absorber.

7. Refrigerating apparatus comprising a generator, an evaporator, an absorber, a hollow member, a conduit connecting said absorber with said hollow member, a conduit connecting said hollow member with the vapor space of said generator, a series of elements in said hollow member forming a central passageway and a series of pockets surrounding said central passageway, said pockets extending upwardly and obliquely with respect to and opening into said central passageway, means to heat the lower ends of said pockets and a conduit for conducting fluid from said generator to said absorber.

In testimony whereof we hereunto affix our signatures.

BALTZAR CARL von PLATEN.
CARL GEORG MUNTERS.